United States Patent
Peura et al.

(10) Patent No.: US 10,228,049 B2
(45) Date of Patent: Mar. 12, 2019

(54) VEHICLE FINAL DRIVE UNIT (FDU) WITH WET CLUTCH(ES)

(71) Applicant: GKN Driveline North America, Inc., Auburn Hills, MI (US)

(72) Inventors: Brent M. Peura, Farmington, MI (US); David D. Spurlock, Waterford, MI (US); Stefan Nicklich, Denver, NC (US); Robert Genway-Haden, Auburn Hills, MI (US); Lei Yang, Troy, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 85 days.

(21) Appl. No.: 15/527,368

(22) PCT Filed: Nov. 20, 2015

(86) PCT No.: PCT/US2015/061885
§ 371 (c)(1),
(2) Date: May 17, 2017

(87) PCT Pub. No.: WO2016/081845
PCT Pub. Date: May 26, 2016

(65) Prior Publication Data
US 2017/0356535 A1    Dec. 14, 2017

Related U.S. Application Data

(60) Provisional application No. 62/082,535, filed on Nov. 20, 2014.

(51) Int. Cl.
*B60K 17/02*    (2006.01)
*B60K 23/08*    (2006.01)
(Continued)

(52) U.S. Cl.
CPC ............. *F16H 37/08* (2013.01); *B60K 17/02* (2013.01); *B60K 23/08* (2013.01); *F16H 48/22* (2013.01);
(Continued)

(58) Field of Classification Search
CPC ............. F16H 57/0457; F16H 57/0473; F16H 57/0483; F16H 57/0409; F16H 37/08;
(Continued)

(56) References Cited

U.S. PATENT DOCUMENTS 3,047,115 A    7/1962    Lee et al.
3,301,359 A    1/1967    Cole et al.
(Continued)

FOREIGN PATENT DOCUMENTS

CN    101796329 A    8/2010
CN    103703283 A    4/2014
(Continued)

OTHER PUBLICATIONS

Written Opinion & International Search Report for PCT/US2015/061885 dated Feb. 2, 2016, 10 pages.
(Continued)

*Primary Examiner* — Jacob S. Scott
*Assistant Examiner* — Lori Wu
(74) *Attorney, Agent, or Firm* — Jennifer M. Brumbaugh; Reising Ethington P.C.

(57) ABSTRACT

A vehicle final drive unit (FDU) of a vehicle driveline. The vehicle FDU includes one or more wet clutches that provide disconnect capabilities in the vehicle FDU, and includes a final drive gearset. Different techniques are provided for discontinuing lubricant supply to the wet clutch(es) when the wet clutch(es) are disconnected in order to preclude unwanted rotations that can be the consequence of adhesion among clutch plates in the wet clutch(es). One technique
(Continued)

actively brakes the final drive gearset in the vehicle FDU so that the final drive gearset no longer rotates and no longer throws lubricant to the wet clutch(es). Another technique involves closing an entrance that leads lubricant to the wet clutch(es).

19 Claims, 10 Drawing Sheets

(51) Int. Cl.
| | |
|---|---|
| *F16H 37/08* | (2006.01) |
| *F16H 48/22* | (2006.01) |
| *F16H 48/34* | (2012.01) |
| *F16H 57/04* | (2010.01) |

(52) U.S. Cl.
CPC ......... *F16H 48/34* (2013.01); *F16H 57/0457* (2013.01); *F16H 57/0473* (2013.01); *F16H 57/0483* (2013.01); *B60K 2023/0825* (2013.01); *B60K 2023/0833* (2013.01); *B60K 2023/0858* (2013.01); *B60Y 2400/4244* (2013.01); *F16H 2048/343* (2013.01)

(58) Field of Classification Search
CPC .... F16H 48/22; F16H 48/34; F16H 2048/343; B60K 17/02; B60K 17/346; B60K 17/3462; B60K 17/348; B60K 23/08; B60K 2023/0833; B60K 2023/0858; B60K 2023/0825; B60Y 2400/4244
See application file for complete search history.

(56) References Cited

U.S. PATENT DOCUMENTS

| | | |
|---|---|---|
| 5,711,740 A | 1/1998 | Bakowski |
| 6,247,566 B1 | 6/2001 | Severinsson |
| 6,345,712 B1 | 2/2002 | Dewald et al. |
| 6,712,190 B2 | 3/2004 | Kitaori et al. |
| 8,234,955 B2 | 8/2012 | Palazzolo et al. |
| 8,308,598 B2 | 11/2012 | Pritchard et al. |
| 8,388,486 B2 | 3/2013 | Ekonen et al. |
| 8,764,599 B2 | 7/2014 | Ekonen et al. |
| 8,845,473 B2 | 9/2014 | Nett et al. |
| 9,291,212 B2 | 3/2016 | Nett et al. |
| 9,518,647 B2 | 12/2016 | Yanagida et al. |
| 2008/0064569 A1* | 3/2008 | Baxter .................. F16D 48/066 477/166 |
| 2012/0031727 A1 | 2/2012 | Nett et al. |
| 2013/0213757 A1 | 8/2013 | Yano et al. |
| 2014/0021005 A1 | 1/2014 | Greiss et al. |
| 2014/0231209 A1 | 8/2014 | Nett et al. |
| 2014/0360291 A1 | 12/2014 | Nett et al. |

FOREIGN PATENT DOCUMENTS

| | | | |
|---|---|---|---|
| CN | 103842693 A | 6/2014 | |
| DE | 102010039447 A1 * | 2/2012 | ............. B60K 17/02 |
| DE | 102012219182 A1 * | 5/2014 | ......... F16H 57/0409 |
| EP | 2416036 A3 | 1/2013 | |
| JP | 2003090370 A | 3/2003 | |
| WO | WO2015120909 A1 | 8/2015 | |

OTHER PUBLICATIONS

CN Office Action for CN Application No. 201580073948.2 dated Dec. 20, 2018 (9 pages).

* cited by examiner

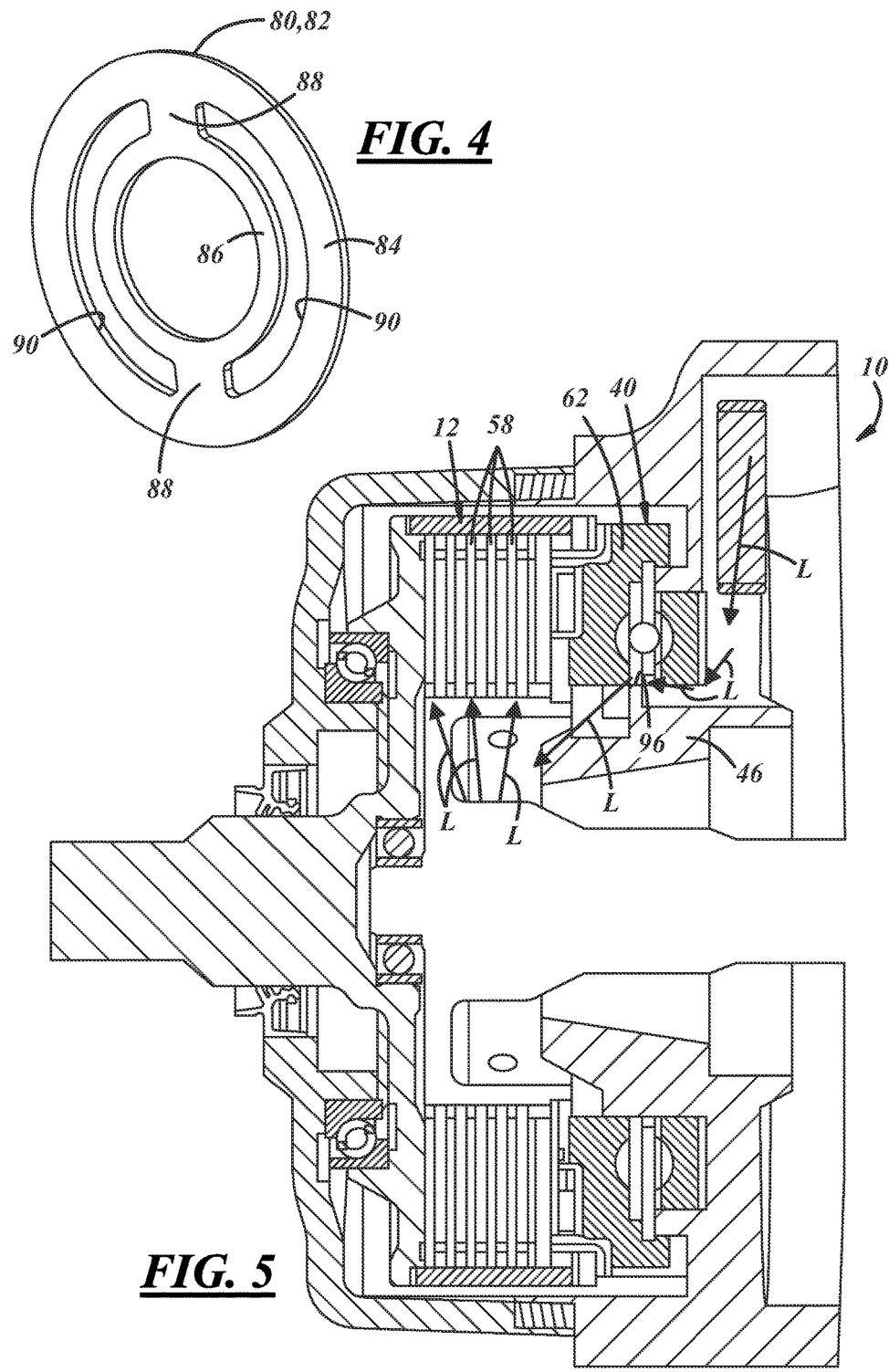

VEHICLE FINAL DRIVE UNIT (FDU) WITH WET CLUTCH(ES)

REFERENCE TO RELATED APPLICATIONS

This application claims the benefit of U.S. Provisional Application Ser. No. 62/082,535 filed on Nov. 20, 2014, the entire contents of which are incorporated herein by reference.

TECHNICAL FIELD

The present disclosure relates generally to vehicle final drive units (FDUs) equipped in vehicle drivelines, and more particularly to vehicle FDUs having one or more wet clutches.

BACKGROUND

In general, vehicle drivelines transmit torque from a vehicle's engine to its wheels. Automotive drivelines, such as all-wheel drive (AWD) drivelines, commonly employ final drive units (FDUs) for transmitting torque to left and right sideshafts that are located downstream an engine and downstream a transmission—oftentimes, FDUs receive driven torque from a propshaft. Final drive units can be mounted at the rear of an automotive driveline or at the front, depending on the architecture of the particular driveline and the location of its engine and transmission. And FDUs can include differential gearsets that allow wheels on one sideshaft to spin faster or slower than wheels on the other sideshaft, and that apportion driven torque between the sideshafts.

Furthermore, some automotive drivelines are equipped with disconnect capabilities in which disconnected components are no longer driven to transmit torque between them. The capabilities preclude driven torque in regions of the automotive drivelines not needing torque at a particular time. For instance, on-demand AWD drivelines do not always transmit torque among all of its shafts at all times. Disconnect capabilities have been shown to increase fuel mileage, reduce emissions, and provide additional performance improvements. In FDUs, disconnect capabilities can be carried out via one or more wet clutches furnished between a final drive gearset and a sideshaft. Wet clutches typically include multiple clutch plates that are brought together to connect components, and brought apart to disconnect components. Lubricant is supplied to the clutch plates amid these actions.

But it has been found that clutch plates and components that should not be rotating when disconnected, still have a tendency to rotate even when the plates are brought apart. Lubricant between the separated clutch plates, it has been learned, produces adhesion and sticking between neighboring plates. When an automobile is traveling on a road, its wheels and sideshafts spin. The spinning sideshaft at a wet clutch rotates some of its plates—an event known as back-driving. And the adhesion between clutch plates can cause unwanted rotation of all the plates and components in the FDU. The unwanted rotations contribute to drag loss experienced in the driveline and ultimately diminish the efficiency of the driveline.

SUMMARY

In one implementation, a vehicle final drive unit (FDU) may include a final drive gearset, a wet clutch, an actuator, and a brake. The final drive gearset may be driven by a driveline driveshaft. The wet clutch may be activated to transmit rotation from the final drive gearset and to a driveline sideshaft. And the wet clutch may be deactivated to cease transmission of rotation from the final drive gearset and to the driveline sideshaft. The wet clutch may receive thrown lubricant via rotation of the final drive gearset. The actuator may activate and deactivate the wet clutch. The actuator may include at least one plate. The plate may move to an actuated position in which the wet clutch is activated, and may move to a deactuated position in which the wet clutch is deactivated. The brake may include a braking component. Upon deactivation of the wet clutch and movement of the plate to the deactuated position, the plate may prompt engagement of the braking component with the final drive gearset and rotation of the final drive gearset may be precluded and the wet clutch may no longer receive thrown lubricant via the final drive gearset.

In another implementation, a vehicle final drive unit (FDU) may include a final drive gearset, a wet clutch, an actuator, and an intermediate wall. The final drive gearset may have a gear that is partly or more submerged in a lubricant bath of the vehicle FDU. The wet clutch may receive lubricant thrown by rotation of the gear in the lubricant bath. The wet clutch may be activated to transmit rotation from the final drive gearset and to a driveline sideshaft. And the wet clutch may be deactivated to cease transmission of rotation from the final drive gearset and to the driveline sideshaft. The actuator may activate and deactivate the wet clutch. The actuator may move axially relative to the driveline sideshaft between an actuated position in which the wet clutch is activated and a deactuated position in which the wet clutch is deactivated. The intermediate wall may have an entrance leading lubricant to the wet clutch. Upon activation of the wet clutch, the actuator may move axially to the actuated position and may open the entrance for introducing lubricant to the wet clutch. And upon deactivation of the wet clutch, the actuator may move axially to the deactuated position and may close the entrance to prevent lubricant from passing through the entrance.

In yet another implementation, a vehicle final drive unit (FDU) may include a housing, a final drive gearset, a wet clutch, an actuator, an intermediate wall, and a brake. The housing may hold a lubricant bath. The final drive gearset may be located partly or more in the housing, and a gear of the final drive gearset may be partly or more submerged in the lubricant bath. The wet clutch may receive lubricant thrown by rotation of the gear in the lubricant bath. The wet clutch may be activated to transmit rotations from the final drive gearset and to a driveline sideshaft. And the wet clutch may be deactivated to cease transmission of rotation from the final drive gearset and to the driveline sideshaft. The actuator may activate and deactivate the wet clutch. The intermediate wall may partly or more define an entrance that leads lubricant to the wet clutch. Upon activation of the wet clutch, the actuator may move to an actuated position and may open the entrance for introducing lubricant to the wet clutch. Upon deactivation of the wet clutch, the actuator may move to a deactuated position and may close the entrance to prevent lubricant from passing through the entrance. And, upon deactivation of the wet clutch, the actuator may prompt engagement of the brake and may preclude rotation of the gear of the final drive gearset.

BRIEF DESCRIPTION OF THE DRAWINGS

FIG. 4 is a perspective view of an embodiment of a disc of the brake of FIG. 3;

FIG. 5 is a segmented sectional view of another embodiment of a FDU that can be employed in the vehicle driveline of FIG. 1;

DETAILED DESCRIPTION

Figure 6:
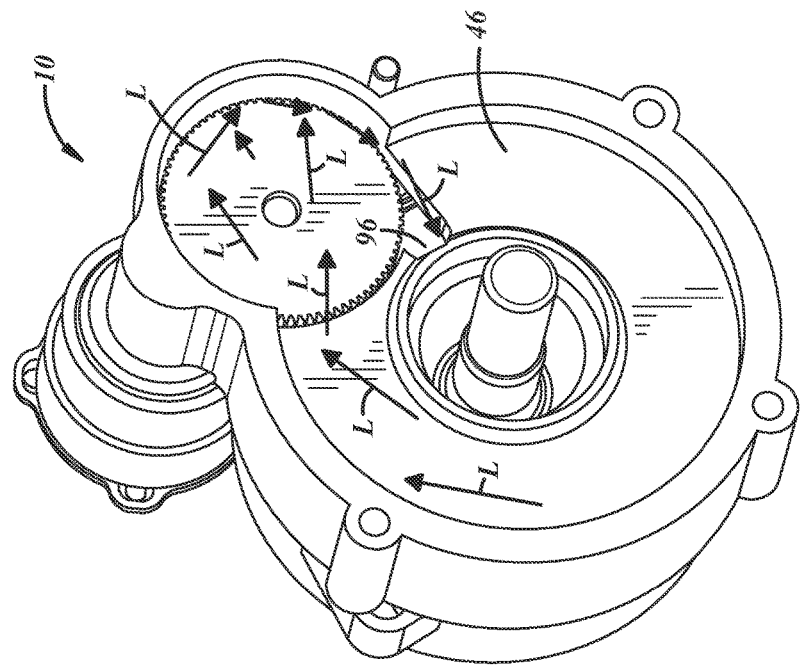
FIG. 6 is a perspective view of the FDU of FIG. 5.

Referring to the drawings, embodiments of a vehicle final drive unit (FDU) 10 for an automobile are shown that include a wet clutch 12 to provide disconnect capabilities in the FDU. The embodiments present different techniques for discontinuing lubricant supply to the wet clutch 12 when the wet clutch is deactivated and its clutch plates are brought apart to disconnect components. One of the techniques detailed below actively brakes components in the FDU 10. It has been shown that these techniques limit or altogether eliminate adhesion among the clutch plates, preclude unwanted rotations, and hence reduce drag loss experienced in the accompanying vehicle driveline and improve its efficiency. In some cases, measures previously taken to preclude unwanted rotations in accompanying vehicle power transfer units (PTUs) can be discarded when the FDUs detailed in this description are put in use, leading to a simplified and less costly PTU. The FDU 10 can be that of a passenger car, truck, sport-utility vehicle (SUV), or some other vehicle type. And although the FDU 10 is mounted at the rear of the vehicle driveline presented in FIG. 1, it could also be mounted at the front of a vehicle driveline in other examples.

Figure 1:
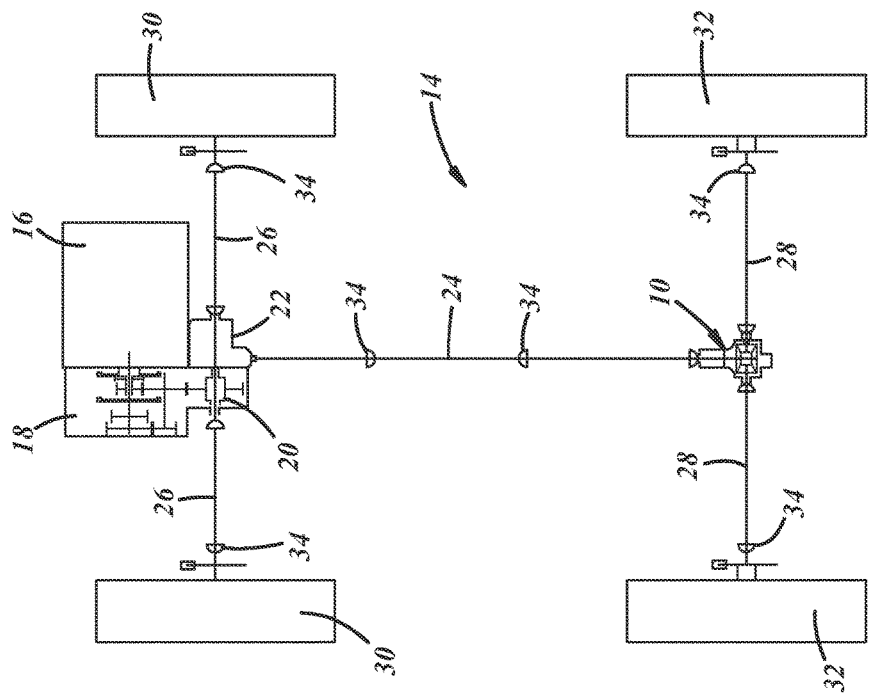
FIG. 1 is a schematic of an example vehicle driveline.
Figure 12:
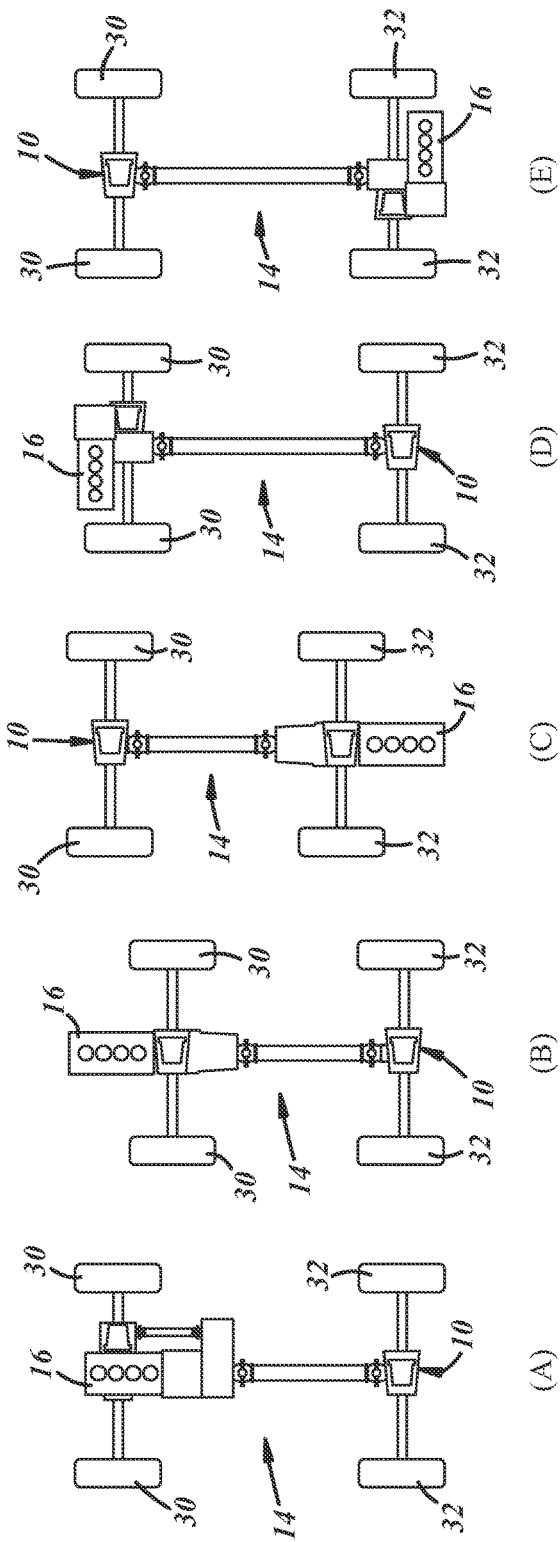
FIG. 12 presents schematics of example vehicle drivelines.

FIG. 1 illustrates an example architecture of an all-wheel drive (AWD) vehicle driveline 14 for an automobile. The driveline 14 receives torque input from an engine 16 and a transmission 18, and includes a front differential 20, a power transfer unit (PTU) 22, a propshaft 24, the FDU 10, front sideshafts 26, and rear sideshafts 28. The front and rear sideshafts 26, 28 respectively spin front and rear wheels 30, 32. In the example here, various joints 34 are located at the propshaft 24 and at the sideshafts 26, 28. The joints 34 could be constant velocity joints, universal joints, tripod joints, cardan joints, or another kind of joint. The PTU 22, also known as a power take-off unit, is a multi-piece mechanism with gears, shafts, and other components that work together to transmit torque to the propshaft 24. Together, the driveline components transmit torque from the engine 16 and to the wheels 30, 32. Still, the driveline 14 could have other architectures in other examples and might include more, less, and/or different components than those depicted in FIG. 1 and described here, and the components can be arranged in different ways. Indeed, the exact architecture and its components are often dictated by the particular vehicle platform and set by the manufacturer. FIG. 12 illustrates additional example architectures of the AWD driveline 14. These example architectures could include the FDU 10 as detailed in this description. From left-to-right in FIG. 12, the driveline 14 could have a longitudinally-arranged engine 16 mounted at the front as depicted in architectures (A) and (B); the driveline 14 could have a longitudinally-arranged engine 16 mounted at the rear as depicted in architecture (C); the driveline 14 could have a transversely-arranged engine 16 mounted at the front as depicted in architecture (D); or, the driveline 14 could have a transversely-arranged engine 16 mounted at the rear as depicted in architecture (E).

Figure 2:
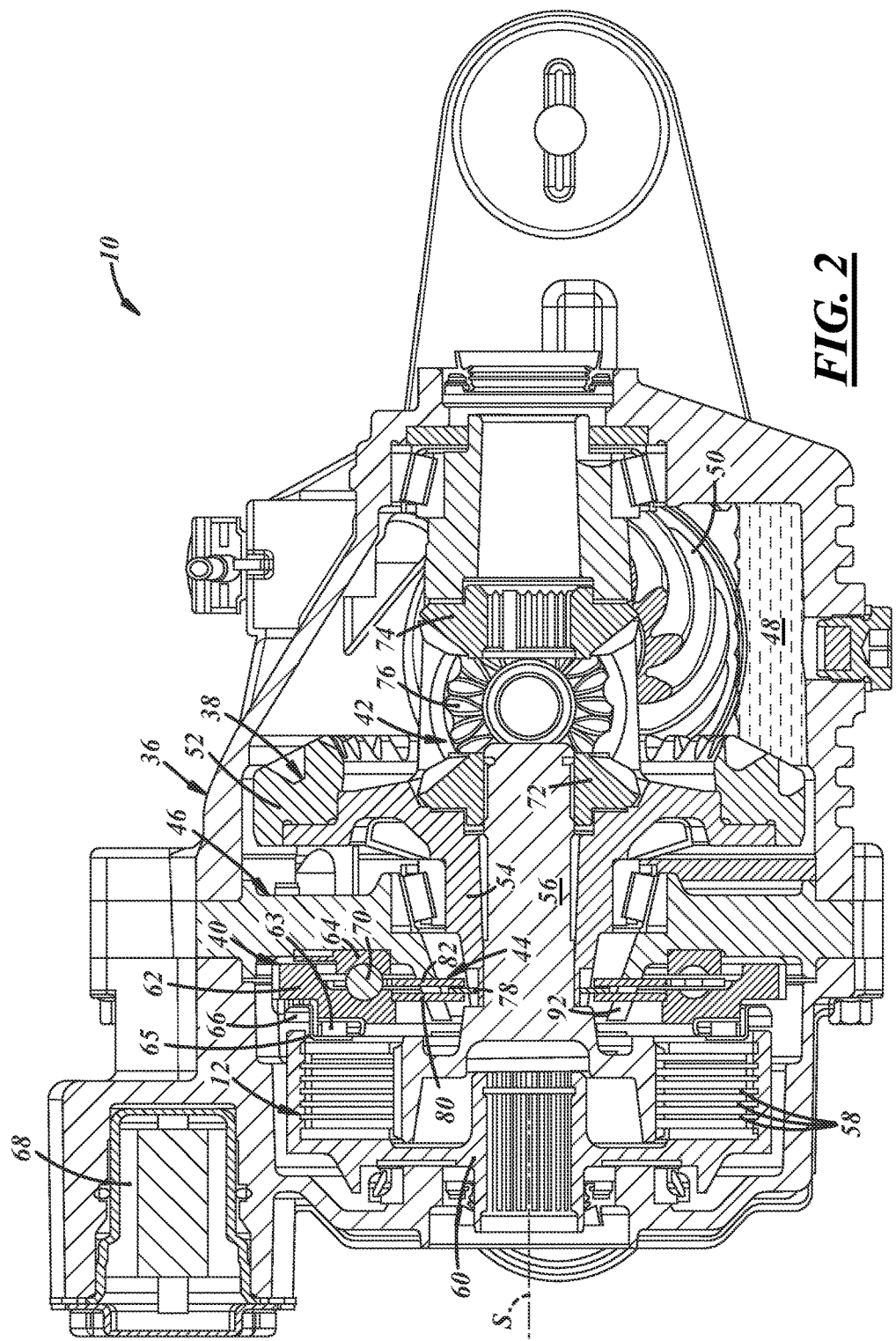
FIG. 2 is a sectional view of an embodiment of a final drive unit (FDU) that can be employed in the vehicle driveline of FIG. 1.

Referring to FIG. 2, the FDU 10 is a multi-piece mechanism with components that work together to transmit torque from the propshaft 24 and to the rear sideshafts 28. The FDU 10 can have different designs, constructions, and components depending on, among other possible influences, the architecture of the driveline 14, the design and construction of the propshaft 24 and that of the rear sideshafts 28, packaging requirements, and torque output demands. In the embodiment presented in FIG. 2, the FDU 10 includes a housing 36, a final drive gearset 38, the wet clutch 12, an actuator 40, a differential gearset 42, a brake 44, and an intermediate wall or housing 46.

The housing 36 serves as a casing and support for other components of the FDU 10. The housing 36 can have different walls, covers, and other structures that enclose the FDU's internal components. Its structures can be composed of metallic and/or nonmetallic materials. Lubricant such as oil is held in the housing 36 in order to lubricate the gears, clutch plates, bearings, and other items enclosed in the FDU 10 as those items rotate, mesh, move, and engage during use. The housing 36 is filled only partway with lubricant to make a resulting lubricant bath 48—in FIG. 2, the lubricant bath is shown at rest and mostly undisturbed from the FDU's internal components. The level of the lubricant bath 48 can be raised or lowered from that depicted in FIG. 2. Lubricant from the lubricant bath 48 is initially distributed among the final drive gearset 38, wet clutch 12, differential gearset 42, and brake 44 via the rotating components of the final drive gearset 38. The lubricant bath 48 is sloshed, splashed, and thrown about, and lubricant eventually makes its way to the wet clutch 12 and to other locations in the housing 36. Feed passages can be defined in the housing 36 and in other components to deliver lubricant to the different locations, including to the wet clutch 12. Accordingly, the same lubricant bath 48 can be used to lubricate the final drive gearset 38, wet clutch 12, differential gearset 42, and brake 44, and the lubricant is supplied without using a pump. The FDU 10 can rely solely on lubricant being thrown about for its lubricant-supply needs.

The final drive gearset 38 receives torque transmission and driven rotational input from the propshaft 24. The final drive gearset 38 can take different forms in different embodiments. In FIG. 2 the final drive gearset 38 has a hypoid design and construction and includes a pinion gear 50 meshed with a ring gear 52. The ring gear 52 is partly submerged in the lubricant bath 48 and throws lubricant about as the ring gear rapidly rotates. The ring gear 52 can be connected to a differential housing 54 which serves as a differential case of the differential gearset 42; in an example of the FDU 10 in which the differential gearset 42 is lacking, the differential housing 54 may simply be a housing with a connection to the ring gear 52. The differential housing 54 can be attached to an inner plate carrier or inner disc carrier 56 so that the two rotate together in unison. The attachment can be effectuated via a spline interfit or another attachment technique. During use of the FDU 10, torque is transmitted from the pinion gear 50, to the ring gear 52, and to the inner plate carrier 56.

The wet clutch 12 furnishes disconnect capabilities between the final drive gearset 38 and one of the rear sideshafts 28. The disconnect capabilities in the FDU 10 can make up just one piece of a larger AWD disconnect system that may include other disconnect capabilities at other locations in the driveline 14, such as a disconnect device in the PTU 22. Still, the FDU 10 could include yet another wet clutch located at its other rear sideshaft 28 in FIG. 2; this example would include a pair of wet clutches and would lack the differential gearset 42. The wet clutch 12 can take different forms in different embodiments. In the embodiment presented by the figures, and still referring to FIG. 2, the wet clutch 12 has a clutch pack containing multiple clutch plates 58. The clutch pack receives the thrown lubricant from the lubricant bath 48. As will be understood by skilled artisans, some of the clutch plates 58 can be layered with friction material, while other clutch plates can be lacking friction material. And a number of the clutch plates 58 can be attached to an extension of the inner plate carrier 56, while a number of the clutch plates can be attached to a carrier of an outer plate carrier 60. The extensions can constitute inner or outer clutch carriers in different forms of the wet clutch 12. The outer plate carrier 60 is internally splined, as shown, for making an interfit with the rear sideshaft 28 on that side of the FDU 10; still, the attachment can be effectuated in other ways. An axis S depicted in FIG. 2 represents an approximate center axis about which the rear sideshaft 28 rotates during operation. When the wet clutch 12 is activated by the actuator 40, the clutch plates 58 are compressed together to connect the inner plate carrier 56 and the outer plate carrier 60. The connection transmits rotation from the final drive gearset 38 and to the rear sideshaft 28. When the wet clutch 12 is deactivated by the actuator 40, the clutch plates 58 are separated apart from one another to disconnect the inner plate carrier 56 and the outer plate carrier 60. The disconnection ceases the transmission of rotation from the final drive gearset 38 to the rear sideshaft 28.

The actuator 40 prompts activation and deactivation of the wet clutch 12 in order to connect and disconnect the final drive gearset 38 and the respective rear sideshaft 28. The actuator's functionality can be managed by an electronic control unit (ECU) or another type of controller. The actuator 40 can take different forms in different embodiments. In the embodiment presented by FIGS. 2 and 3, the actuator 40 includes a plate 62, a reaction collar 64, a spring 66, and an electric motor 68. The plate 62 and reaction collar 64 together define one or more ball ramp tracks for interacting with one or more balls 70. And although not shown, the balls 70 can be held together by a ball cage. The plate 62 is driven to rotate by the electric motor 68, and in turn moves axially with respect to the inner plate carrier 56 as the balls 70 ride in the ball ramp tracks. Rotation of the plate 62 in one direction (clockwise or counterclockwise) moves the plate in a first linear and axial direction, and rotation of the plate in the opposite direction moves the plate in a second opposite linear and axial direction. These axial displacements bring the plate 62 between an actuated position toward the clutch plates 58 to compress them, and a deactuated position away from the clutch plates to separate them. In FIG. 2, the plate 62 is depicted in the deactuated position with the clutch plates 58 separated. During the movements, the reaction collar 64 remains static and merely provides a reaction structure for the plate's movement. Indeed, the reaction collar 64 can have a fixed attachment to the intermediate housing 46. The spring 66 exerts a biasing force against the plate 62 to urge the plate to the deactuated position. Further, in the embodiment of FIGS. 2 and 3, the actuator 40 includes a bearing 63 such as an axial needle bearing, and includes a spring seat and bearing thrust washer 65. Still, in other forms the actuator 40 can have more, less, and/or different components than those shown in the figures and described here.

The differential gearset 42 performs differential functionalities between the rear sideshafts 28 of the driveline 14. Generally, torque is apportioned between the rear sideshafts 28, and the rear sideshafts can spin at different speeds relative to each other. The differential gearset 42 can take different forms in different embodiments. In the embodiment presented by FIG. 2, the differential gearset 42 includes side gears 72, 74 and pinion gears 76 (only one shown) arranged on a pin (not shown). The side gear 72 is attached to the inner plate carrier 56 for rotation therewith, and the side gear 74 transmits torque to the rear sideshaft 28 on that side of the FDU 10. Still, in other forms the differential gearset 42 can have more, less, and/or different components than those shown in the figures and described here. And yet still, as previously set forth, the differential gearset 42 need not be provided in all embodiments of the FDU 10.

In use, and when the wet clutch 12 is deactivated and disconnected, the clutch plates 58 of the outer plate carrier 60 are rotated by the spinning rear sideshaft 28 on that side of the FDU 10. The clutch plates 58 of the inner plate carrier 56, on the other hand, should not rotate since the clutch plates are separated apart from one another; and the inner plate carrier itself should not rotate. But it has been found that the clutch plates 58 of the inner plate carrier 56 and the inner plate carrier can indeed rotate even when the wet clutch 12 is deactivated. It has been learned that lubricant between the separated clutch plates 58 produces adhesion and sticking between neighboring plates and can consequently cause the unwanted rotations. And when the ring gear 52 is backdriven, it throws lubricant about and to the wet clutch 12, which can exacerbate the adhesion and sticking. The unwanted rotations can, under some circumstances, backdrive the propshaft 24 and other upstream components of the driveline 14. When this occurs, drag loss experienced in the driveline 14 is increased and overall driveline efficiency is decreased.

Figure 3:
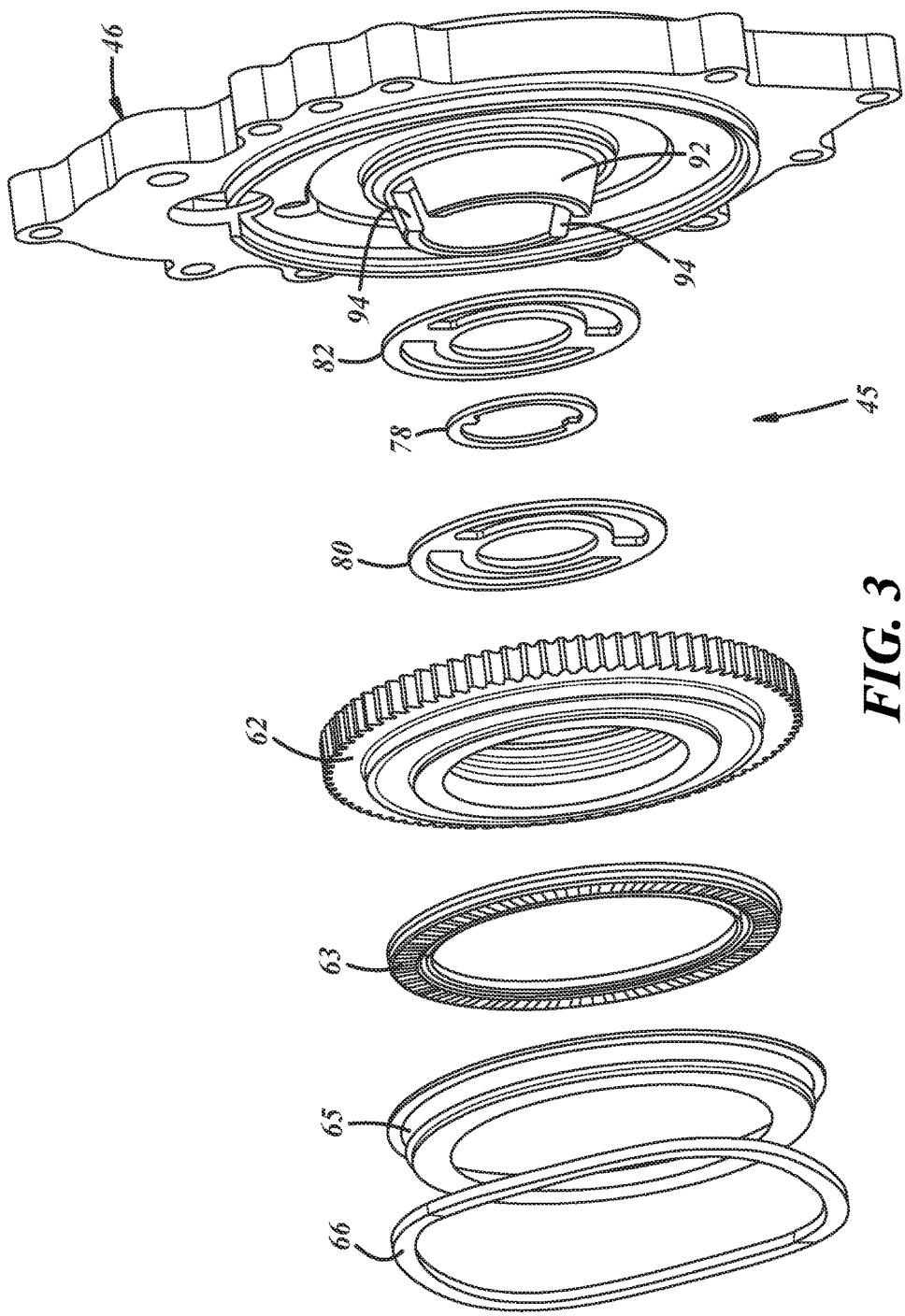
FIG. 3 is an exploded view of actuator components and brake components of the FDU of FIG. 2.

The brake 44 halts and precludes the unwanted rotations that might occur from the deactivated wet clutch 12 and to the final drive gearset 38 as a consequence of adhesion between the clutch plates 58 and backdriving. The brake 44 can have many designs, constructions, actions, and components depending on, among other influences, the designs and constructions of the final drive gearset 38 and wet clutch 12 and actuator 40. In the embodiment presented by FIGS. 2, 3, and 4, the brake 44 includes a first disc 78, a second disc 80, and a third disc 82. One or more of the first, second, and/or third discs 78, 80, 82 can constitute a braking component 45 of the brake 44. The first disc 78 has a smaller diameter than that of the second and third discs 80, 82. It can have a fixed attachment to the differential housing 54 so that the first disc 78 rotates with the differential housing and ring gear 52 during use of the FDU 10. One or both of the axial faces of the first disc 78 confronting the second and third discs 80, 82 can be layered with friction material, though need not. Referring particularly to FIGS. 3 and 4, the second and third discs 80, 82 can have similar designs and constructions. Only the second disc 80 is described here, but the description applies equally to the third disc 82. The second disc 80 has an outer annular portion 84 and an inner annular portion 86. The portions 84, 86 are connected to each other via an attachment web 88, and are spaced from each other via cutouts 90. On an axial face that confronts the first disc 78 in installation, the inner annular portion 86 can be layered with friction material, though need not; and the outer annular portion 84 can remain free of friction material, though need not. Still, in embodiments not depicted by the figures, the brake 44 could only include a single disc engaged by a component of the actuator 40, could include two discs, or could include more than three discs.

Figure 10:
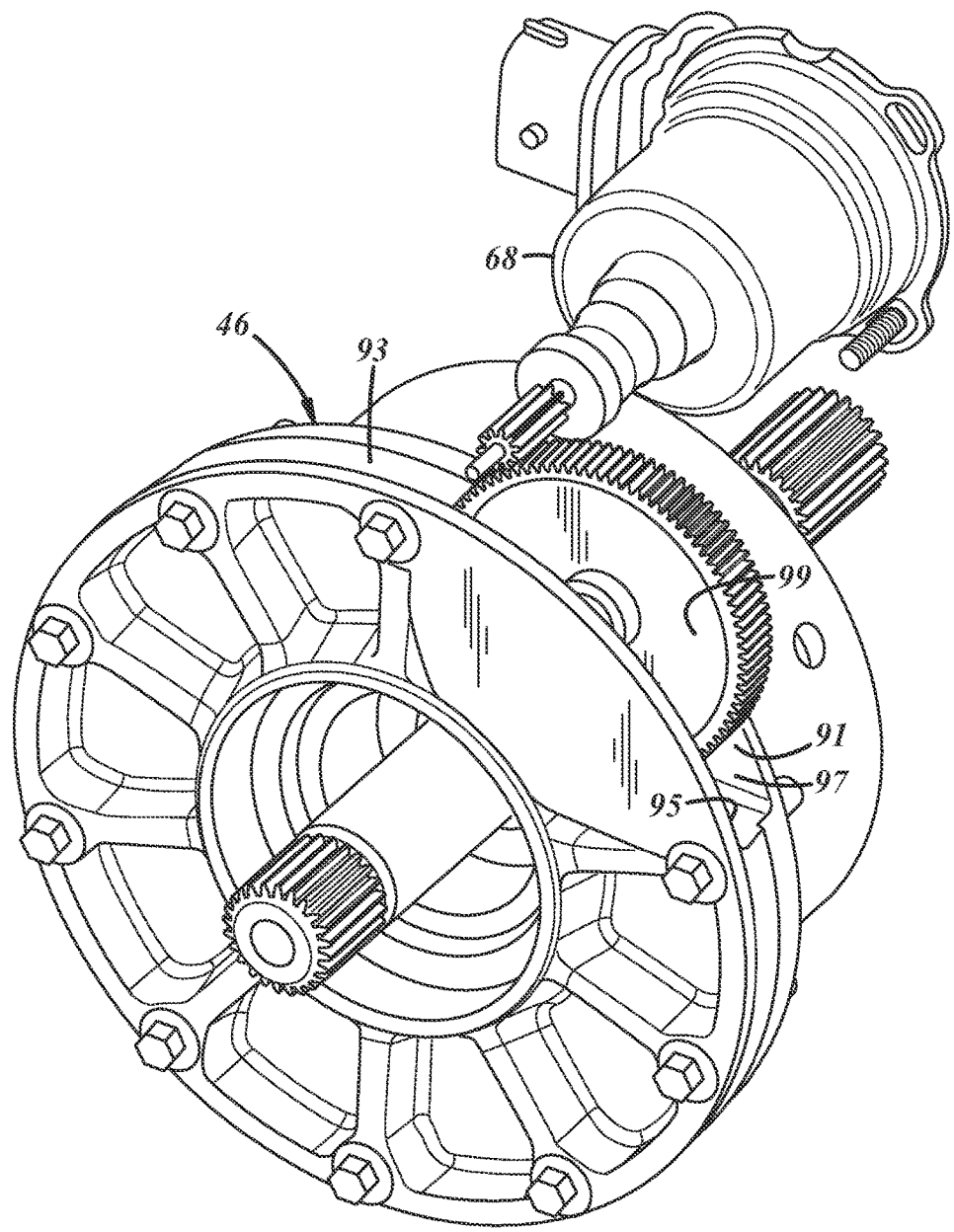
FIG. 10 is a perspective view of some components of an embodiment of a FDU that can be employed in the vehicle driveline of FIG. 1.

The intermediate housing 46 provides support for components of the FDU 10 such as support for the actuator 40, and interacts with the brake 44 in order to assist actions taken by the brake. The intermediate housing 46 can serve as a cover that partially partitions the interior of the FDU 10, and somewhat segregates the wet clutch 12 and actuator 40 from other components of the FDU. Referring now particularly to FIGS. 2 and 3, the intermediate housing 46 has an extension 92 with a truncated cone shape and with slots 94 on opposite sides of the shape. The extension 92 can be a unitary part of the intermediate housing 46, or can be a separate part that is connected to the intermediate housing. In installation, the extension 92 carries both the second and third discs 80, 82 via a slot-spline interrelation with the attachment web 88 inserted into the slots 94. Still, the extension 92 could carry the second and third discs 80, 82 in other ways. Since the intermediate housing 46 does not rotate during use of the FDU 10, the second and third discs 80, 82 do not rotate either. Furthermore, an embodiment of the intermediate housing 46 is presented in FIG. 10. In this embodiment, the intermediate housing 46 has a cavity 91 defined on a side of the intermediate housing 46 generally directed toward the differential gearset 42 (i.e., directed to the right-hand side of FIG. 2). A wall 93 of the housing 36 also has a cavity 95. Together, and as illustrated in FIG. 10, the cavities 91, 95 form a pocket 97. The pocket 97 accommodates partial reception and insertion of a reduction gear 99 of the actuator 40. The pocket 97 also serves as a reservoir for holding lubricant of the lubricant bath 48 that makes its way to the pocket 97. Lubricant from the lubricant bath 48 could make its way to the pocket 97 via one or more passages defined within the housing 36 and/or defined within the intermediate housing 46. In other embodiments, the pocket 97 could be formed entirely by a cavity in the intermediate housing 46.

In use, the brake 44 and its discs 78, 80, 82 actively halt and preclude the unwanted rotations that might be experienced by the ring gear 52 due to backdriving of the rear sideshafts 28. When the actuator 40 is deactivated, the spring 66 biases the plate 62 to its deactuated position. As the plate 62 moves axially to the deactuated position, it comes into abutment with the outer annular portion 84 of the second disc 80 and slides the second disc along the sleeve 92 and into engagement with the first disc 78. The abutment between the plate 62 and second disc 80 is made via a step defined in the plate which receives the annular portion 84; in other embodiments, that abutment between the plate and second disc could be made in other ways. When the abutment is made, the inner annular portions 86 of the second and third discs 80, 82 are urged against and sandwich the first disc 78 by the exerted biasing force of the spring 66. The discs 78, 80, 82 make surface-to-surface contact and bring any rotations of the differential housing 54 and ring gear 52 to a halt, and preclude initiation of subsequent unwanted rotations amid deactivation. The biasing force of the spring 66 can be sufficient to effect halting without the need for supplemental forces. Because the ring gear 52 no longer rotates at deactivation, it no longer throws lubricant about from the lubricant bath 48. Moreover, neither the propshaft 24 nor the PTU 22 are backdriven. Since the PTU 22 experiences little to no backdriving, measures similar to the FDU brake need not be employed in the PTU, as might have previously been the case. The PTU's design and construction can resultantly be simplified and less costly. Having a brake, such as the brake 44, in the FDU 10 and lacking such a brake in the accompanying PTU may be preferred in some drivelines. For instance, oftentimes PTUs are subject to stricter packaging constraints than FDUs, so incorporating a brake's construction within a PTU may present greater challenges than doing so in a FDU. Moreover, typically, the design and construction of a FDU may be more complex than the design and construction of a PTU, so a FDU's design and construction may provide more opportunity to incorporate a brake's construction therein and may better accommodate the brake's construction.

Figure 11:
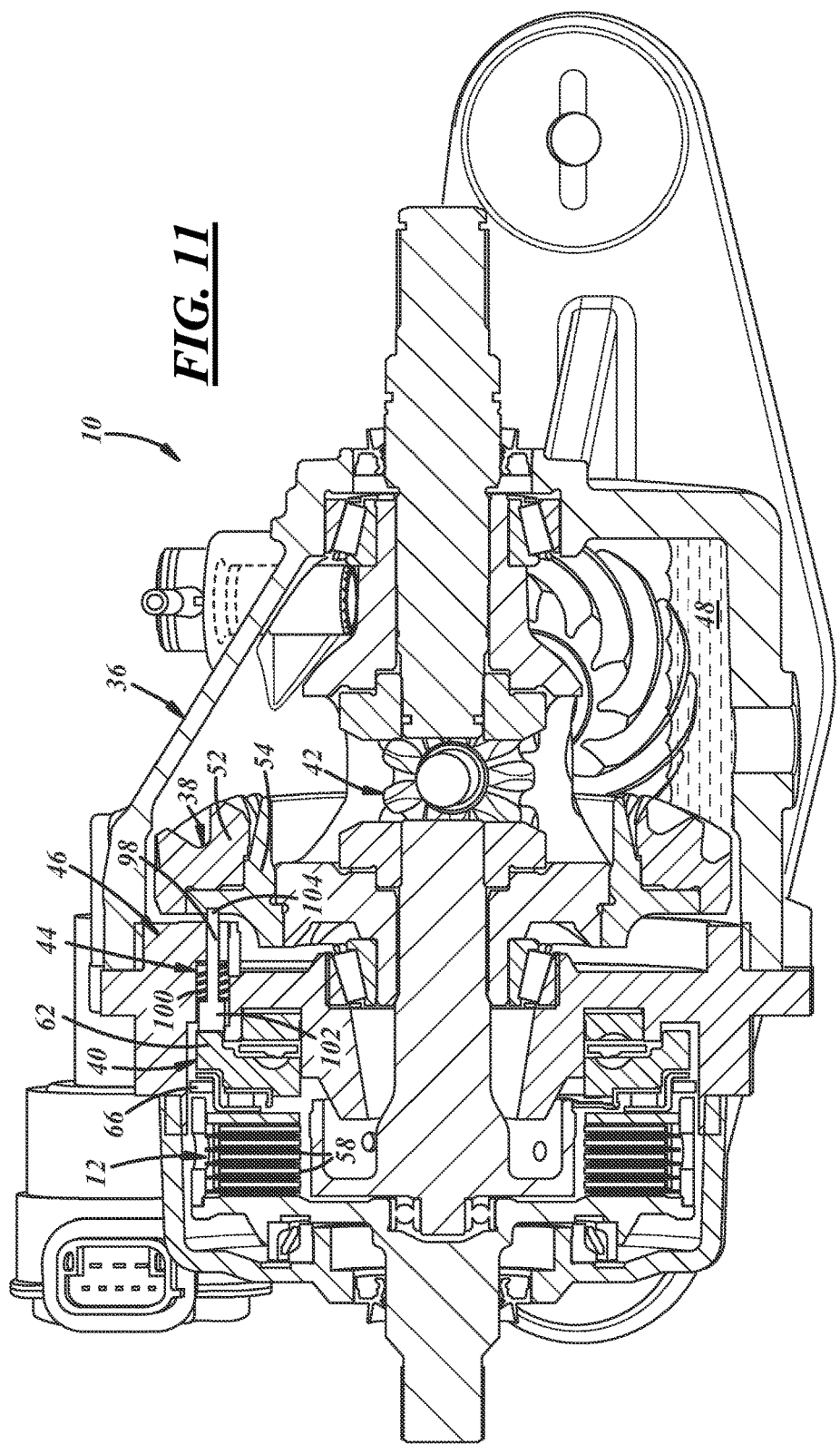
FIG. 11 is a sectional view of another embodiment of a FDU that can be employed in the vehicle driveline of FIG. 1.

Another embodiment of the brake 44 is presented in FIG. 11. In FIG. 11, similar components with the previous embodiments are given the same reference numerals, and their descriptions will not be repeated here. As before, the brake 44 of FIG. 11 halts and precludes the unwanted rotations that might occur from the deactivated wet clutch 12 and to the final drive gearset 38 as a consequence of adhesion between the clutch plates 58 and backdriving. In the embodiment here, the brake 44 includes a pin 98 and a spring 100—one or both of these components can constitute the braking component 45 of the brake 44. The pin 98 is carried in a bore in the intermediate housing 46, and extends therethrough. At one end, a head 102 of the pin 98 is abutted directly by the plate 62 when the plate moves axially to the deactuated position. At another end, a shank 104 of the pin 98 spans entirely through the intermediate housing 46 and engages the differential housing 54; for this engagement, the differential housing 54 could have a recess for receiving the shank 104. The spring 100 is seated between the pin 98 and the intermediate housing 46. In use, the pin 98 moves axially (relative to the accompanying rear sideshaft 28) between a locked position and an unlocked position. The locked position is illustrated in FIG. 11. When the actuator 40 is deactuated, the spring 66 biases the plate 62 to its deactuated position. As the plate 62 moves axially to the deactuated position, it moves the pin 98 into engagement with the differential housing 54 and to the pin's locked position. The force of the spring 100, if the spring is indeed provided, is overcome by the force of the spring 66. In the locked position, the pin 98 precludes initiation of unwanted rotations of the differential housing 54 and ring gear 52. When the actuator 40 is actuated and the plate 62 is moved toward the clutch plates 58, the pin 98 is disengaged from the differential housing 54 and moves to its unlocked position. In the unlocked position, the differential housing 54 and ring gear 52 can rotate without interference from the pin 98. The spring 100 can bias the pin 98 to its unlocked position when the actuator 40 is actuated.

Figure 13:
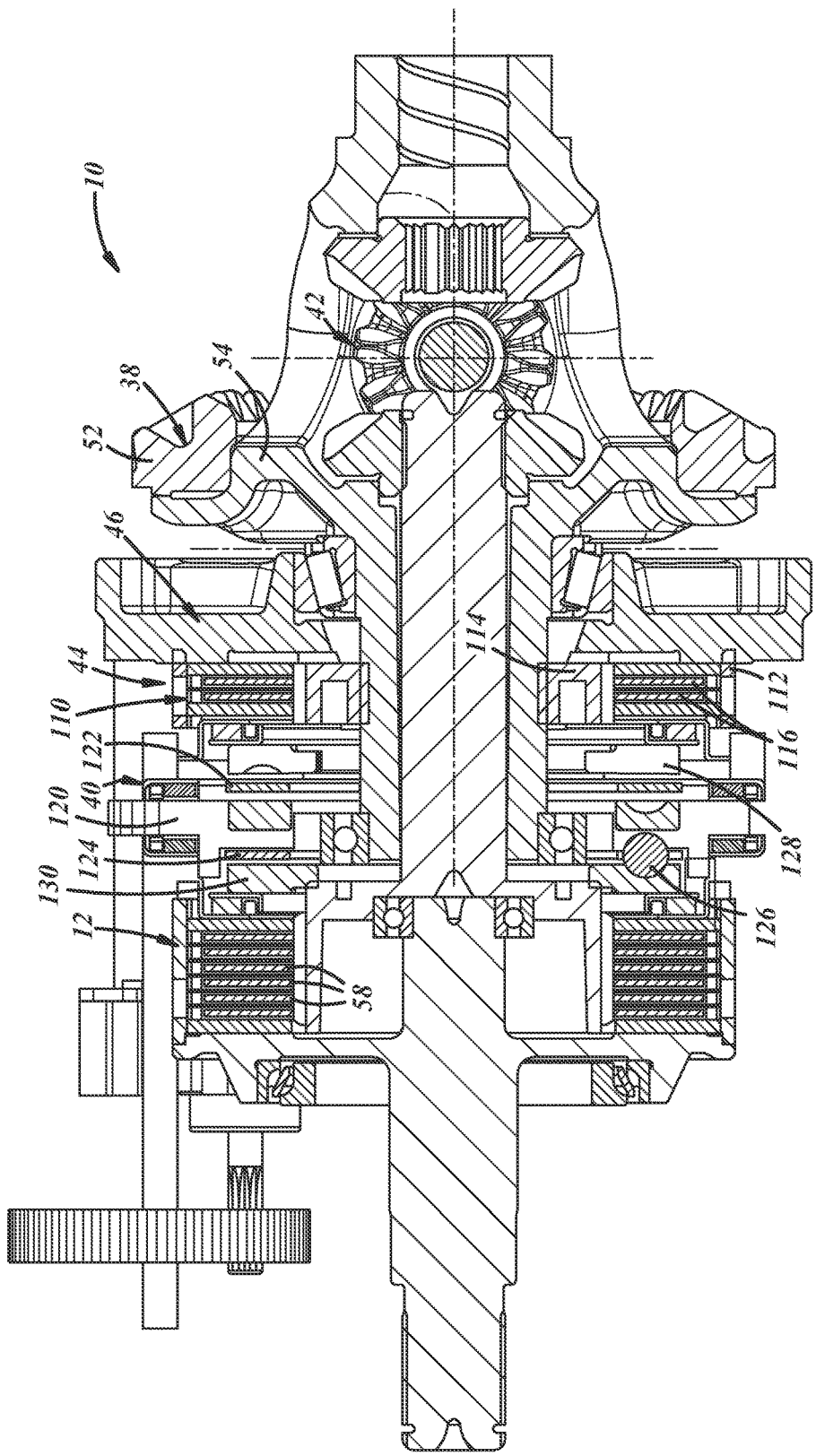
FIG. 13 is a sectional view of yet another embodiment of a FDU that can be employed in the vehicle driveline of FIG. 1.

Yet another embodiment of the brake 44 is presented in FIG. 13. In FIG. 13, similar components with the previous embodiments are given the same reference numerals, and their descriptions will not be repeated here. As before, the brake 44 of FIG. 13 halts and precludes the unwanted rotations that might occur from the deactivated wet clutch 12 and to the final drive gearset 38 as a consequence of adhesion between the clutch plates 58 and backdriving. In the embodiment here, the brake 44 includes a clutch pack 110—the clutch pack 110 can constitute the braking component 45 of the brake 44. The clutch pack 110 has an outer plate carrier 112 and an inner plate carrier 114, and has multiple clutch plates 116 interconnected therebetween. The outer plate carrier 112 is connected to the intermediate housing 46, and the inner plate carrier 114 is connected to the differential housing 54. The connections can be made in different ways, including via a spline interfit. The actuator 40 in this embodiment may differ from actuators in previous embodiments. In FIG. 13, the actuator 40 includes a ramp drive 118 having a gear 120 that rotates via an electric motor (not shown in FIG. 13), having a first ball rack or cage 122 that holds a set of balls (not shown in FIG. 13), having a second ball rack or cage 124 that holds a set of balls 126, having a first plate 128, and having a second plate 130. The gear 120 can have grooves on each of its sides for accommodating the balls of the first and second ball cages 122, 124. Similarly, the first and second plates 128, 130 have complementary grooves for accommodating the balls of the first and second ball cages 122, 124.

In operation, the first and second plates 128, 130 move in the axial direction (relative to the rear sideshaft 28), and do not rotate themselves. The gear 120 does not move axially in this embodiment. When rotated in a first rotational direction (e.g., clockwise or counterclockwise), interactions with the first ball cage 122 and its set of balls 126 cause the first plate 128 to move axially in the axial direction away from the gear 120 and towards the clutch pack 110. Concurrently, the second plate 130 moves axially in the axial direction away from the wet clutch 12 and towards the clutch pack 110 due to interactions with the second ball cage 124 and its set of balls 126. With this movement and concomitant displacement, the first plate 128 is brought to its actuated position and compresses the clutch plates 116 of the clutch pack 110—the clutch pack 110 is hence activated. Furthermore, the second plate 130 is brought to its deactuated position and the clutch plates 58 of the wet clutch 12 are separated—the wet clutch 12 is hence deactivated. Contrarily, when the gear 120 is rotated in a second and opposite rotational direction, the first plate 128 moves axially in the axial direction towards the gear 120 and away from the clutch pack 110, and the second plate 130 moves axially in the axial direction towards the wet clutch 12 and away from the gear 120. The first plate 128 is brought to its deactuated position and the clutch pack 110 is deactivated, and the second plate 130 is brought to its actuated position and the wet clutch 12 is activated. When the clutch pack 110 is activated, the initiation of unwanted rotations of the differential housing 54 and ring gear 52 is precluded.

Still, in yet another embodiment of the brake 44 not depicted in the figures, the brake could include a set of cones that could be layered with friction material, though need not. The cones could be geometrically shaped similar to the extension 92 of the intermediate housing 46, as depicted in FIG. 3. Like the discs 78, 80, 82 of the previous embodiment, one cone could be connected to the differential housing 54 and one or more additional cones could be in contact with the intermediate housing 46. Each single cone, or a combination of them, could constitute the braking component 45. The cones would come together upon deactivation and axial movement of the plate 62 of the actuator 40, and would thereby bring any rotations of the differential housing 54 and ring gear 52 to a halt.

Figure 7:
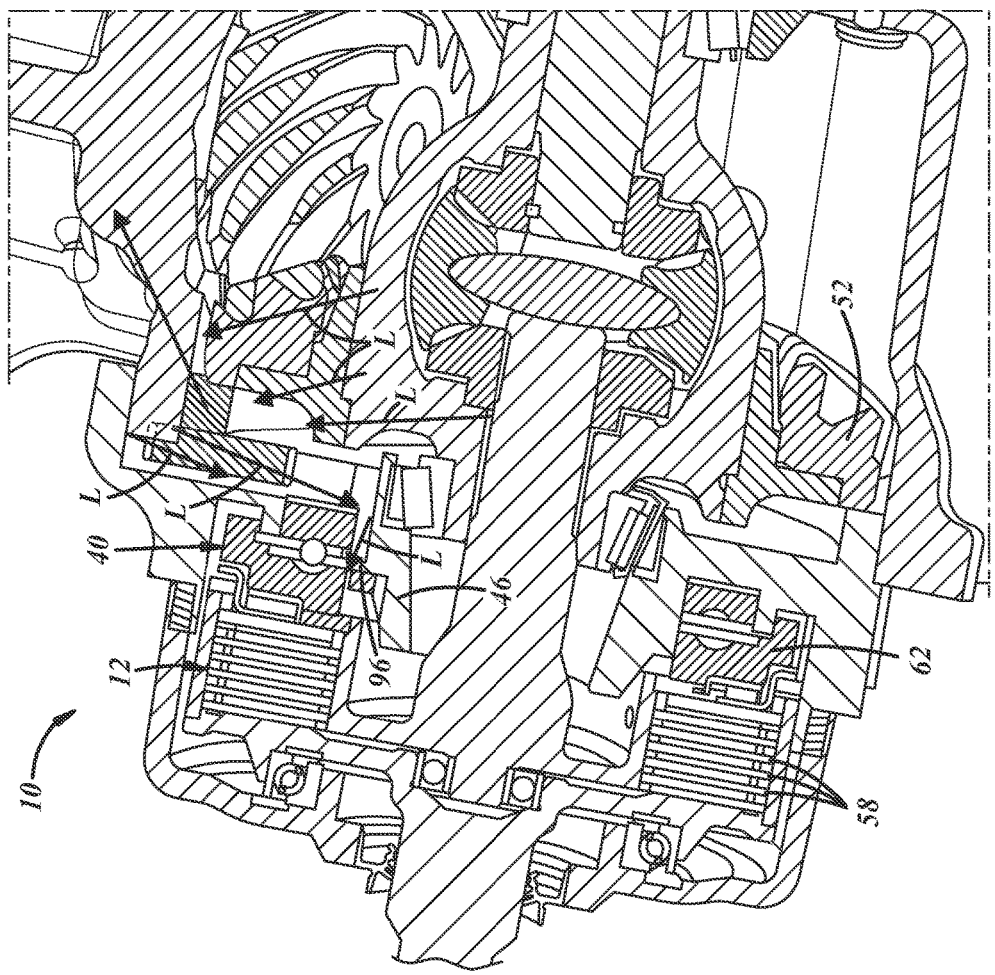
FIG. 7 is a segmented sectional view of the FDU of FIG. 5.
Figure 9:
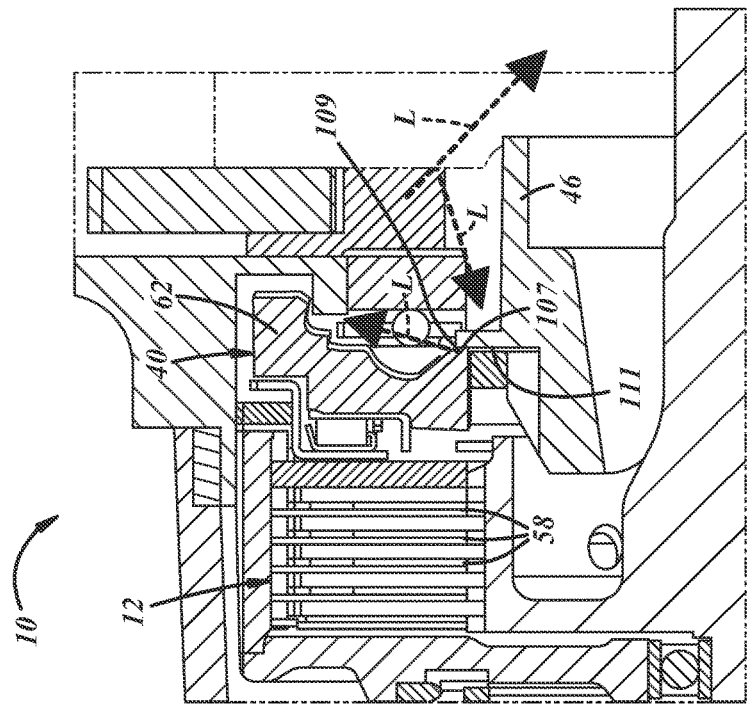
FIG. 9 is a segmented sectional view of another form of the FDU of FIG. 5.
Figure 8:
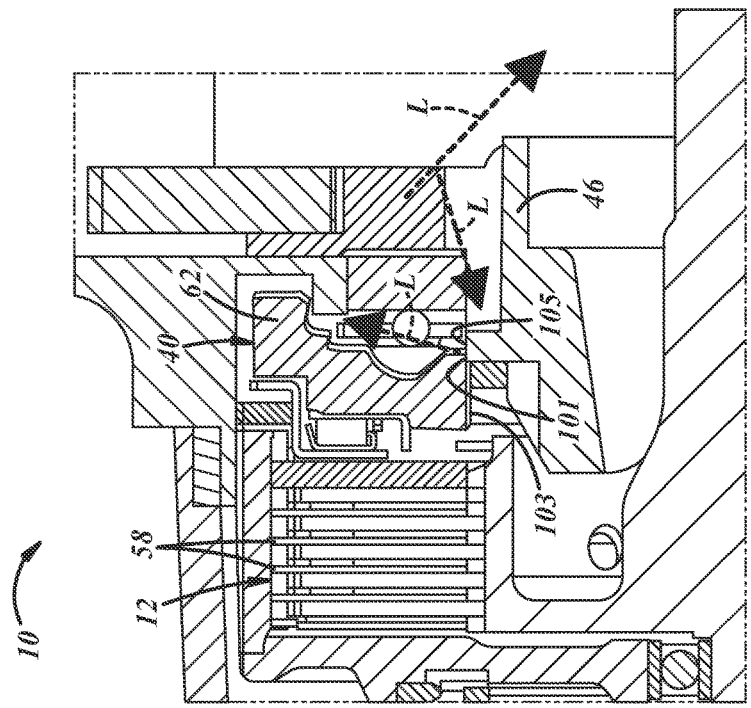
FIG. 8 is a segmented sectional view of one form of the FDU of FIG. 5.

FIGS. 5-9 depict another embodiment of the FDU 10. Many components of this embodiment are similar to those of the embodiment of FIGS. 1-4. The similar components are given the same reference numerals in the figures, and their descriptions will not be repeated here. Like the previous embodiment, the embodiment of FIGS. 5-9 can experience unwanted rotations when its wet clutch 12 is deactivated due to adhesion and sticking among the separated clutch plates 58. Instead of actively braking the unwanted rotations, however, the FDU 10 of FIGS. 5-9 prevents thrown lubricant of the lubricant bath 48 from making its way to the wet clutch 12 when the actuator 40 is deactivated and the clutch plates 58 are separated. Referring particularly to FIGS. 5, 6, and 7, lubricant L is thrown about by the ring gear 52 and eventually passes through an entrance 96 in the intermediate housing 46. Before passing through the entrance 96, lubricant L can collect in the pocket 97 as previously described with reference to FIG. 10. The entrance 96 fluidly communicates with, and is open to, the wet clutch 12 and its clutch plates 58, and leads lubricant L to those components. When the actuator 40 is activated and the plate 62 is moved to the actuated position, the entrance 96 is open and lubricant L can pass through the entrance—this is depicted in FIGS. 5, 6, and 7. When the actuator 40 is deactivated, on the other hand, and the plate 62 is moved to the deactuated position, the entrance 96 is closed and lubricant L is therefore prevented from passing through it—this is depicted in FIGS. 8 and 9. The entrance 96 can be closed in different ways and by different components. In FIG. 8, for example, the entrance 96 is closed by surface-to-surface abutment and sealing between the intermediate housing 46 and the plate 62 in the axial direction (relative to the rear sideshaft 28). This produces an axial interfacial abutment 101 that provides a physical obstruction in place of the previously open entrance 96. The axial interfacial abutment 101 is made between a radially-inwardly-directed surface 103 of the plate 62 and a radially-outwardly-directed surface 105 of the intermediate housing 46. And in the example of FIG. 9, the entrance 96 is closed by surface-to-surface abutment and sealing between the intermediate housing 46 and the plate 62 in the radial direction (relative to the rear sideshaft 28). This produces a radial interfacial abutment 107 that provides a physical obstruction in place of the previously open entrance 96. The radial interfacial abutment 107 is made between an axially-directed inboard surface 109 of the plate 62 and an axially-directed outboard surface 111 of the intermediate housing 46. In both of the examples of FIGS. 8 and 9, the entrance 96 is closed via axial movement (relative to the rear sideshaft 28) of the plate 62.

In other embodiments, one or more of the brakes of FIGS. 1-4, 11, and 13 could be employed and combined with one or more of the embodiments of FIGS. 5-9 that open and close the entrance via surface-to-surface abutment. In these embodiments, more than one measure would help ensure that adhesion and sticking among the separated clutch plates 58 is limited or altogether eliminated, and the unwanted rotations and backdriving is precluded.

It is to be understood that the above description is intended to be illustrative and not restrictive. Many embodiments and applications other than the examples provided would be apparent to those of skill in the art upon reading the above description. The scope of the invention should be determined, not with reference to the above description, but instead with reference to the appended claims, along with the full scope of equivalents to which such claims are entitled. It is anticipated and intended that future developments will occur in the arts discussed herein, and that the disclosed assemblies and methods will be incorporated into such future embodiments. In sum, it should be understood that the invention is capable of modification and variation that is limited only by the following claims.

All terms used in the claims are intended to be given their broadest reasonable construction and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary. Further, the terms "axial" or "axially" and "radial" or "radially" are used for ease of description with reference to the identified axis or axes; these terms are not intended to be limiting and other terms like lateral, longitudinal, inward, outward, or the like are intended to be covered and not excluded.

What is claimed is:

1. A vehicle final drive unit (FDU), comprising:
a final drive gearset driven by a driveline driveshaft;
a wet clutch activated to transmit rotation from said final drive gearset and to a driveline sideshaft, said wet clutch deactivated to cease transmission of rotation from said final drive gearset and to the driveline sideshaft, said wet clutch receiving thrown lubricant via rotation of said final drive gearset;
an actuator activating and deactivating said wet clutch, said actuator including at least one plate, said at least one plate moving to an actuated position in which said wet clutch is activated, and said at least one plate moving to a deactuated position in which said wet clutch is deactivated; and
a brake including a braking component;
wherein, upon deactivation of said wet clutch and movement of said at least one plate to the deactuated position, said at least one plate prompts engagement of said braking component with said final drive gearset and rotation of said final drive gearset is precluded and said wet clutch no longer receives thrown lubricant via said final drive gearset.

2. A vehicle final drive unit (FDU) of claim 1, wherein said final drive gearset includes a ring gear, the vehicle FDU further comprises a housing holding a lubricant bath, said ring gear is at least partly submerged in said lubricant bath and throws lubricant from said lubricant bath when said ring gear rotates, and at least some of the thrown lubricant is received by said wet clutch.

3. A vehicle final drive unit (FDU) of claim 1, wherein said braking component engages a differential housing when prompted by said at least one plate, and rotation of said final drive gearset is precluded via the engagement and said wet clutch no longer receives thrown lubricant via said final drive gearset.

4. A vehicle final drive unit (FDU) of claim 1, wherein said actuator includes a spring, said spring biasing said at least one plate to the deactuated position, said braking component is at least one disc, said at least one plate prompting engagement of said at least one disc with said final drive gearset.

5. A vehicle final drive unit (FDU) of claim 4, wherein said at least one disc includes a first disc and a second disc, said first disc is connected to said final drive gearset, said second disc is urged against said first disc by said at least one plate upon deactivation of said wet clutch and upon movement of said at least one plate to the deactuated position, the urging of said second disc against said first disc precludes rotation of said final drive gearset and discontinues throwing of lubricant to said wet clutch via said final drive gearset.

6. A vehicle final drive unit (FDU) of claim 5, wherein said first disc is connected to a housing of said final drive gearset and said second disc is carried by an extension of an intermediate housing in the vehicle FDU, said second disc moves on the extension toward and away from said first disc upon deactivation and activation of said wet clutch.

7. A vehicle final drive unit (FDU) of claim 4, wherein said at least one disc includes a first disc, a second disc, and a third disc, and the vehicle FDU further comprises a wall located at least partly in an interior of the vehicle FDU, said first disc is connected to said final drive gearset, said second disc and said third disc are carried by said wall via a slot-spline interrelation, and, upon deactivation of said wet clutch and upon movement of said at least one plate to the deactuated position, said at least one plate urges said first, second, and third discs together, and rotation of said final drive gearset is precluded and said wet clutch no longer receives thrown lubricant via said final drive gearset.

8. A vehicle driveline comprising said vehicle FDU of claim 1, and comprising a vehicle power transfer unit (PTU) located upstream of said vehicle FDU relative to transmission of torque in the vehicle driveline, said vehicle PTU lacking a brake that precludes rotation of components in said vehicle PTU.

9. A vehicle final drive unit (FDU) of claim 1, wherein said braking component is a pin, and wherein, upon deactivation of said wet clutch and movement of said at least one plate to the deactuated position, said at least one plate prompts engagement of said pin with said final drive gearset and rotation of said final drive gearset is precluded and said wet clutch no longer receives thrown lubricant via said final drive gearset.

10. A vehicle final drive unit (FDU) of claim 1, wherein said braking component is a clutch pack, and wherein, upon deactivation of said wet clutch and movement of said at least one plate to the deactuated position, said at least one plate prompts engagement of said clutch pack with said final drive gearset whereby said clutch pack is activated and rotation of said final drive gearset is precluded and said wet clutch no longer receives thrown lubricant via said final drive gearset.

11. A vehicle final drive unit (FDU), comprising:
a final drive gearset having a gear at least partly submerged in a lubricant bath of the vehicle FDU;
a wet clutch receiving lubricant thrown by rotation of said gear in said lubricant bath, said wet clutch activated to transmit rotation from said final drive gearset and to a driveline sideshaft, said wet clutch deactivated to cease transmission of rotation from said final drive gearset and to the driveline sideshaft;
an actuator activating and deactivating said wet clutch, said actuator moving axially relative to the driveline sideshaft between an actuated position in which said wet clutch is activated and a deactuated position in which said wet clutch is deactivated; and
an intermediate wall having an entrance leading lubricant to said wet clutch;
wherein, upon activation of said wet clutch, said actuator moves axially to the actuated position and opens said entrance for introducing lubricant to said wet clutch, and, upon deactivation of said wet clutch, said actuator moves axially to the deactuated position and closes said entrance to prevent lubricant from passing through said entrance.

12. A vehicle final drive unit (FDU) of claim 11, wherein said actuator includes a plate, said plate moving axially between the actuated and deactuated positions, and said entrance is closed in the deactuated position via surface-to-surface abutment between said plate and said intermediate wall.

13. A vehicle final drive unit (FDU) of claim 11, wherein said entrance is closed when said actuator is moved to the deactuated position via a surface-to-surface abutment between said actuator and said intermediate wall, said surface-to-surface abutment being generally situated in an axial direction with respect to the driveline sideshaft.

14. A vehicle final drive unit (FDU) of claim 11, wherein said entrance is closed when said actuator is moved to the deactuated position via a surface-to-surface abutment between said actuator and said intermediate wall, said surface-to-surface abutment being generally situated in a radial direction with respect to the driveline sideshaft.

15. A vehicle final drive unit (FDU) of claim 11, wherein a pocket is formed at least in part by said intermediate wall, said pocket fluidly communicating with said entrance, said pocket holding lubricant adjacent said entrance that is thrown by rotation of said gear in said lubricant bath.

16. A vehicle final drive unit (FDU), comprising:
a housing holding a lubricant bath;
a final drive gearset located at least partly in said housing, a gear of said final drive gearset at least partly submerged in said lubricant bath;
a wet clutch receiving lubricant thrown by rotation of said gear in said lubricant bath, said wet clutch activated to transmit rotation from said final drive gearset and to a driveline sideshaft, said wet clutch deactivated to cease transmission of rotation from said final drive gearset and to the driveline sideshaft;
an actuator activating and deactivating said wet clutch;
an intermediate wall at least partly defining an entrance leading lubricant to said wet clutch; and
a brake;
wherein, upon activation of said wet clutch, said actuator moves to an actuated position and opens said entrance for introducing lubricant to said wet clutch, and, upon deactivation of said wet clutch, said actuator moves to a deactuated position and closes said entrance to prevent lubricant from passing through said entrance, and, upon deactivation of said wet clutch, said actuator prompts engagement of said brake and precludes rotation of said gear of said final drive gearset.

17. A vehicle final drive unit (FDU) of claim 16, wherein, upon deactivation of said wet clutch, said entrance is closed via surface-to-surface abutment between said actuator and said intermediate wall.

18. A vehicle final drive unit (FDU) of claim 16, wherein said brake includes at least one disc, and, upon deactivation of said wet clutch, said actuator prompts engagement of said at least one disc with said final drive gearset in order to preclude rotation of said gear of said final drive gearset.

19. A vehicle driveline comprising said vehicle FDU of claim 16, and comprising a vehicle power transfer unit (PTU) located upstream of said vehicle FDU relative to transmission of torque in the vehicle driveline, said vehicle PTU lacking a brake that precludes rotation of components in said vehicle PTU.

* * * * *